US011731323B2

United States Patent
Lin et al.

(10) Patent No.: US 11,731,323 B2
(45) Date of Patent: Aug. 22, 2023

(54) MICROWAVE AND ELECTROMAGNETIC HEATED FOAMING METHOD, MOLD AND FOAMING MATERIAL THEREOF

(71) Applicant: Herlin Up Co., Ltd., Zhuqi Township, Chiayi County (TW)

(72) Inventors: Po-Chang Lin, Zhuqi Township (TW); Kuang-Tse Chin, Taichung (TW); Jung-Hsiang Hsieh, Zhuqi Township (TW); Ya-Chun Yu, Caotun Township (TW)

(73) Assignee: Herlin Up Co., Ltd., Zhuqi Township (TW)

( * ) Notice: Subject to any disclaimer, the term of this patent is extended or adjusted under 35 U.S.C. 154(b) by 517 days.

(21) Appl. No.: 16/849,031

(22) Filed: Apr. 15, 2020

(65) Prior Publication Data
US 2020/0331178 A1  Oct. 22, 2020

(30) Foreign Application Priority Data

Apr. 18, 2019 (TW) ................... 108113623

(51) Int. Cl.
| C08J 9/10 | (2006.01) |
| B29C 44/34 | (2006.01) |
| B29C 35/08 | (2006.01) |
| C08J 9/00 | (2006.01) |
| C08J 9/232 | (2006.01) |
| B29K 105/04 | (2006.01) |
| B29K 509/00 | (2006.01) |
| B29K 23/00 | (2006.01) |

(52) U.S. Cl.
CPC ...... B29C 44/3415 (2013.01); B29C 35/0805 (2013.01); C08J 9/0066 (2013.01); C08J 9/103 (2013.01); C08J 9/232 (2013.01); *B29C 2035/0855* (2013.01); *B29K 2023/06* (2013.01); *B29K 2023/083* (2013.01); *B29K 2105/04* (2013.01); *B29K 2509/00* (2013.01); *C08J 2203/04* (2013.01); *C08J 2203/22* (2013.01); *C08J 2323/06* (2013.01); *C08J 2323/08* (2013.01)

(58) Field of Classification Search
CPC .............. B29C 44/341; B29C 35/0805; B29C 2035/0855; B29C 33/3828; B29C 44/58; B29C 44/02; C08J 9/0066; C08J 9/103; C08J 9/232; C08J 2203/04; C08J 2203/22; C08J 2323/06; C08J 2323/08; C08J 9/32; C08J 2201/026; C08J 2300/22; C08J 2203/184; C08J 2423/06; B29K 2023/06; B29K 2023/083; B29K 2105/04; B29K 2509/00; B29K 2105/0005; Y02P 20/10
See application file for complete search history.

(56) References Cited

U.S. PATENT DOCUMENTS 4,853,420 A * 8/1989 Pham ....................... C08J 9/232
264/45.2

FOREIGN PATENT DOCUMENTS

| JP | H11268043 | * 10/1999 | |
| JP | 2000-29650 | * 10/2000 | |
| WO | WO-2010083769 A1 | * 7/2010 | ........... B29C 33/048 |

* cited by examiner

*Primary Examiner* — Irina S Zemel
(74) *Attorney, Agent, or Firm* — Alan D. Kamrath; Karin L. Williams; Mayer & Williams PC

(57) ABSTRACT

Present invention is related to a microwave and electromagnetic heated foaming method, mold and foaming material thereof. The microwave and electromagnetic heated foaming method comprises steps of adding a foam material into a mold, simultaneously applying a microwave and electromagnetic energy toward the mold under a normal or low pressure, and the microwave and electromagnetic energy made the foam material into molded foam body. The mold of the present invention has a microwave penetrating part and an electromagnetic heating part. The microwave penetrating part has an extruded bottom that is corresponded to a dented top of the electromagnetic heat penetrating part. By utilizing the microwave and electromagnetic energy, the present invention is about to provide an efficient way for processing the foaming material compared to the conventional infrared or electrical heated tube heating and achieve the foam method that can be executed under normal or low pressure.

2 Claims, 3 Drawing Sheets

MICROWAVE AND ELECTROMAGNETIC HEATED FOAMING METHOD, MOLD AND FOAMING MATERIAL THEREOF

FIELD OF INVENTION

The present invention generally relates to a foaming molding method, a mold and a foaming material thereof, especially to a molding method, a mold and a foaming material using microwave and electromagnetic as heat sources for forming or foaming a foam body.

The present invention has been developed primarily to be a foaming molding method, a mold and a foaming material thereof and will be described hereinafter with reference to this application. However, it will be appreciated that the invention is not limited to this particular field of use.

BACKGROUND OF THE INVENTION

A conventional foaming method is processed with heating a foaming material by conducted with an external heat source so as to promote and activate a foaming agent in the foaming material to be foamed and molded properly.

This kind of heating method came from an external heat source which could easily cause uneven heating and result in bad quality to final product. Also, this external heat source often needs to apply along with high pressure during the foaming process. Some crystalline materials, plastic or polymers are not applicable for such high pressure without result in breaking, cracking or poor molding.

As a development of science and technology, the foaming process came up with a new technique by heating the foaming material utilizing the microwave. Microwaves could cause resonance effect among specific molecules in the foaming material for improving the problem of uneven heating from outside to inside caused by aforementioned conductive heating method. However, a mold applied to the new heating technique of microwave must be made of plastic for penetrating microwaves which the plastic mold is commonly considered not durable enough. Hence, it is eager to have a novel foaming method and its mold and material that will overcome or substantially ameliorate at least one or more of the deficiencies of a prior art, or to at least provide an alternative solution to the problems.

It is to be understood that, if any prior art information is referred to herein, such reference does not constitute an admission that the information forms part of the common general knowledge in the art.

SUMMARY OF THE INVENTION

In order to solve shortcomings of conventional heating techniques like external heating and microwaves heating, the present invention is required.

In accordance, a first concept of the present invention is a microwave and electromagnetic heated foaming method comprising steps of: putting a foaming material into a mold; applying a microwave and an electromagnetic energy to the mold at the same time under atmospheric condition or low pressure condition; the microwave is applied to the microwave penetrating part and the electromagnetic energy is applied to the electromagnetic heating part of the mold; and forming the foaming material in to a foam body inside the mold applying by the microwave and the electromagnetic energy.

The aforementioned mold comprises a microwave penetrating part and an electromagnetic heating part to form a closed space inside the mold. The microwave penetrating part and the electromagnetic heating part have a matched concave-convex structure.

In accordance, a second concept of the present invention is a mold for the microwave and electromagnetic heated foaming method comprising a microwave penetrating part with a extruding bottom; an electromagnetic heating part with a concave top; and the microwave penetrating part and the electromagnetic heating part have a matched concave-convex structure with each other to form a closed space inside the mold.

In accordance, the present invention has the following advantages:

By using the microwave and electromagnetic energy, the mold of the present invention is not necessary to make the whole plastic mold. The present invention could just simply use the plastic material on the microwave penetrating part. The other part of the mold in the present invention still can be produced by the metal which could provide more duration to the mold. Heat conversion efficiency and heating efficiency of the electromagnetic energy is faster than other conventional heating source such as infrared heating or electric heating tube. Hence, the present invention can save more energy and obtain great foaming effect of the foam body under atmospheric or low pressure.

The heating method of the conventional foaming process like infrared or electrical heated tube will commonly end up with bad molding result to the foam body due to poor heat conducting efficiency and uneven heating. Also, the foam material using by the conventional foaming process is normally stacked loosely inside the mold and make the heat source cannot easily to reach every foam material evenly. Hence, the present invention provides a foaming method with dual heating sources and special mold structure design which could raise the temperature of the mold faster and more evenly. This could improve the problems of the conventional foaming process as described above. Moreover, the aforementioned advantages can also allow the present invention to tremendously reduce the heat loss and energy consumption compared to the conventional heating method like hot air, infrared or electrical heated tube. The heat transfer rate of the electromagnetic energy is higher than the heat transfer rate of other single heating method (like microwave, electrical heated tube or hot air) which could accelerate the raise of the temperature in the mold. Due to high efficiency and evenly heating abilities, the present invention can reduce the cost of the traditional physical or chemical foaming process without purchasing various and expansive equipments like foam molding equipment, foam injection equipment, steam molding equipment (especially for polystyrene foam beads) and extruding molding equipment. Further by special mold structure design, the present invention can be quickly introduced to the existed equipments owned by the manufacturer for producing high quality foaming products without purchasing expansive equipments like heat pressing machine, injection machine or steam molding machine.

The closed space inside the mold provided by the present invention can be adjusted by the microwave penetrating part and the electromagnetic heating part of the mold during the foaming process. By screwing the microwave penetrating part and the electromagnetic heating part of the mold more closely, the beads or particles of the foaming material in the present invention can then be compressed by the mold more tightly for gaining a better and evenly heat conduction. This could achieve purposes of reducing energy consumption and shorten processing time. The foam body of the present invention is able to be produced under atmospheric press or low pressure. The foaming method provided by the present invention can simply be applied to the conventional chemical foaming process or physical foaming process. The dual heating sources of the present invention is providing a more even and faster heating result which can make the foaming agent to be more stable and react more uniformly in the foaming material. The crosslinking agent of the present invention is able to improve a melting strength within the foaming material and also can cause evenly foaming result to the crystallized or non crystallized plastic or polymer material. This could benefit to the crystallized plastic/polymer material to be molded more easily and reduce the problems like breaking or cracking cellular of the foam body. The foaming method of the present invention is also suitable for physical foaming process without the existence of foaming agent. Physical foaming process and it material are considered more environmental friendly due to the waste of this material can be fully recycled and reused.

Many of the attendant features and advantages of the present invention will become better understood with reference to the following detailed description considered in connection with the accompanying figures and drawings.

BRIEF DESCRIPTION OF THE DRAWINGS

The steps and the technical means adopted by the present invention to achieve the above and other objects can be best understood by referring to the following detailed description of the preferred embodiments and the accompanying drawings.

DETAILED DESCRIPTION OF THE PREFERRED EMBODIMENTS

Figure 1:
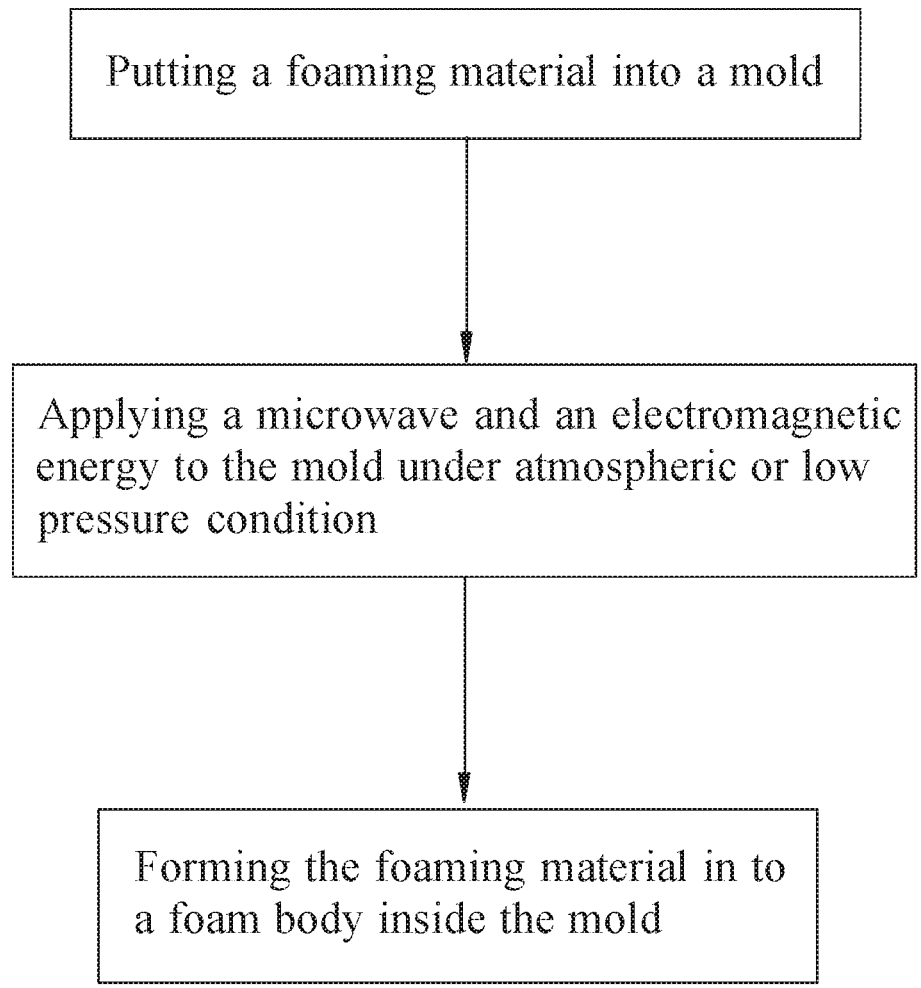
FIG. 1 is a flow chart of a preferred embodiment of the foaming method in accordance to the present invention.

Reference will now be made in detail to the present preferred embodiments of the invention, examples of which are illustrated in the accompanying drawings. Wherever possible, the same reference numbers are used in the drawings and the description to refer to the same or like parts. It is not intended to limit the method by the exemplary embodiments described herein. In the following detailed description, for purposes of explanation, numerous specific details are set forth in order to attain a thorough understanding of the disclosed embodiments. It will be apparent, however, that one or more embodiments may be practiced without these specific details. As used in the description herein and throughout the claims that follow, the meaning of "a", "an", and "the" may include reference to the plural unless the context clearly dictates otherwise. Also, as used in the description herein and throughout the claims that follow, the terms "comprise or comprising", "include or including", "have or having", "contain or containing" and the like are to be understood to be open-ended, i.e., to mean including but not limited to.

<<Foaming Method>>

With reference to FIG. 1, a preferred embodiment of a microwave and electromagnetic heated foaming method comprises steps as following:

Step 1: putting a foaming material into a mold 10, wherein: the mold 10 comprises a microwave penetrating part 11 and an electromagnetic heating part 13 to form a closed space inside the mold 10;

Step 2: applying a microwave W and an electromagnetic energy E to the mold 10 at the same time under atmospheric condition or low pressure condition. More preferably, the microwave W is applied to the microwave penetrating part 11 and the electromagnetic energy E is applied to the electromagnetic heating part 13 of the mold 10; and Step 3: forming the foaming material in to a foam body inside the mold 10 heating by the microwave W and the electromagnetic energy E.

The aforementioned microwave W is preferably having a frequency at a range of 100 MHz to 3000 GHz, more preferably at a range of 300 MHz to 3000 GHz. The electromagnetic energy E is preferably having power at a range of 1 W to 2000 KW. The energy of the microwave W and the electromagnetic energy E applied to the mold 10 could be adjusted according to properties of the foaming material or desired condition of the foam body.

<<Mold>>

Figure 2:
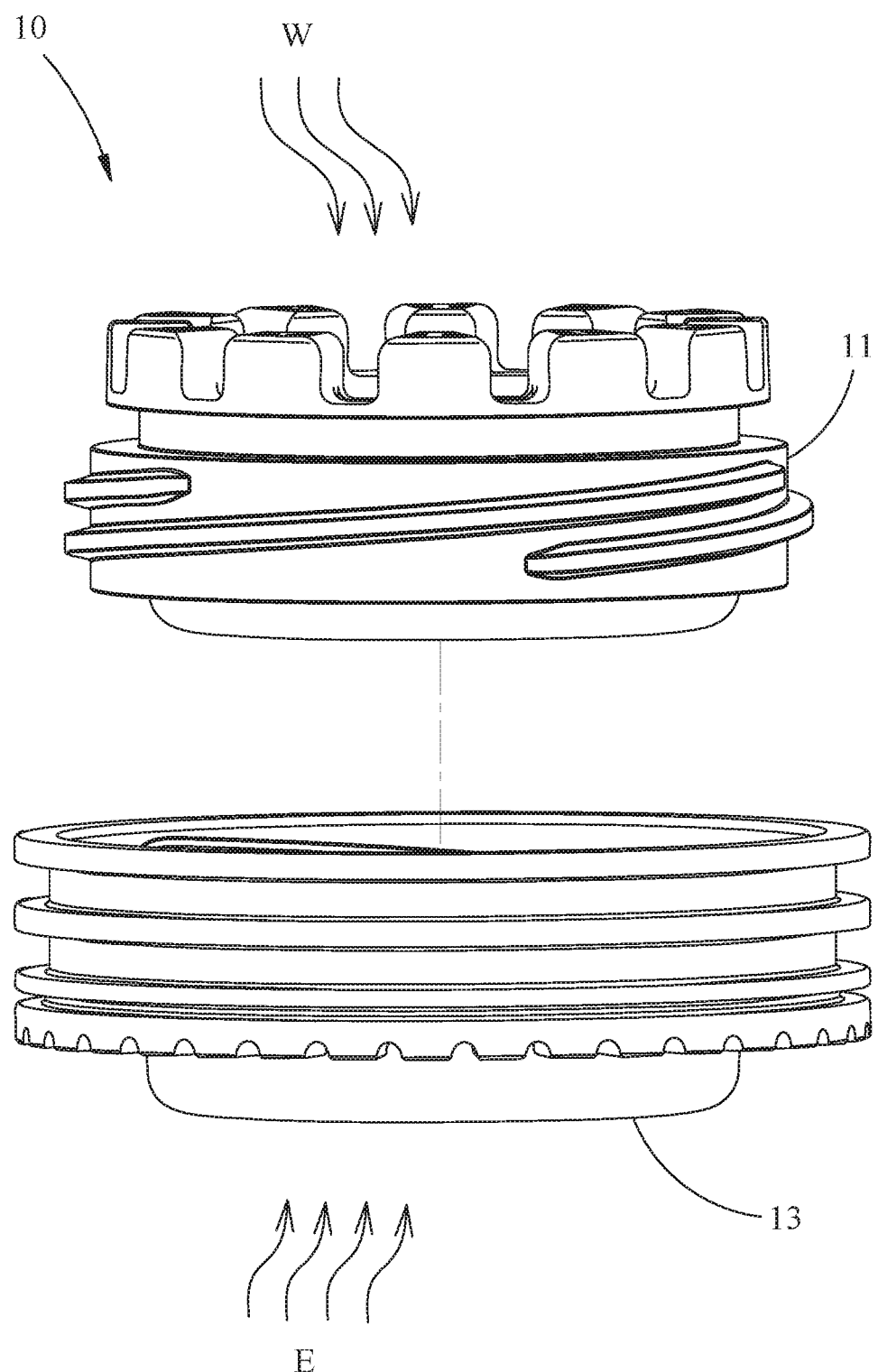
FIG. 2 is a illustration of a first embodiment of the mold in accordance to the present invention.
Figure 3:
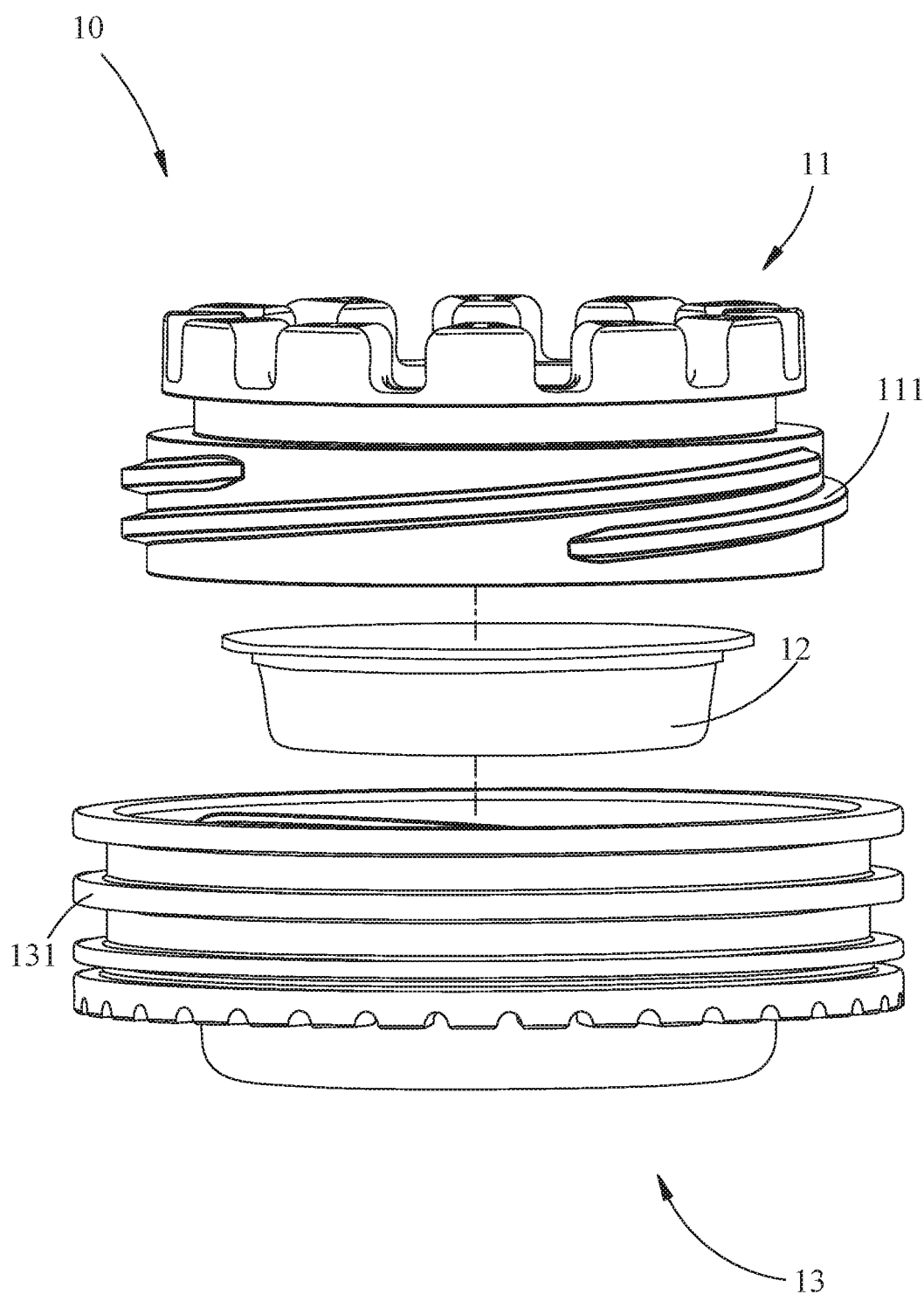
FIG. 3 is a illustration of a second embodiment of the mold in accordance to the present invention.

With reference to FIG. 2, the microwave penetrating part 11 of the mold 10 in the present invention is preferably having plastic material for successfully penetrating microwave. The electromagnetic heating part 13 is preferably having metal material for successfully generating heat toward the foaming material. A first embodiment of the mold 10, the microwave penetrating part 11 and the electromagnetic heating part 13 have a matched concave-convex structure with each other. For example, the microwave penetrating part 11 is protruding outwardly from its bottom. The microwave penetrating part 11 is used as a lid of the mold 10 and could be covered upon the electromagnetic heating part 13. The electromagnetic heating part 13 comprises a concave part at its top (dented top) for placing the bottom of the microwave penetrating part 11. When the microwave penetrating part 11 is covered upon the electromagnetic heating part 13, the closed space will be formed inside the mold 10. With reference to FIG. 3, a second embodiment of the mold 10 is presented. The second embodiment of the mold 10 also has the microwave penetrating part 11, the electromagnetic heating part 13 and further comprises a middle lid 12. In this embodiment, the bottom of the microwave penetrating part 11 is appeared to be flat without protruding from its body. The middle lid 12 otherwise has a protruding part matched with the concave part of the electromagnetic heating part 13. When assembly the mold 10 of this embodiment, the middle lid 12 is firstly covered the electromagnetic heating part 13 and then the microwave penetrating part 11 is further covered upon the electromagnetic heating part 13. The protruding part of the middle lid 12 and the concave part of the electromagnetic heating part 13 will form the closed space for putting the foaming material. The bottom of the protruding part of the middle lid 12 will push a surface of the foaming material against the electromagnetic heating part 13 for better and even heating result. In the first and second embodiments of the mold 10 of the present invention, the microwave penetrating part 11 and/or the middle lid 12 could be pressed by an external force from pneumatic machinery, electric machinery or hydraulic machinery for achieving a better closure to the mold 10.

Furthermore, a third embodiment of the mold 10 is described as following. An outer surface of the microwave penetrating part 11 and an inner surface of the electromagnetic heating part 13 have a matching screw structure (111, 131) so as to adjust a height of the microwave penetrating part 11 being assembled with the electromagnetic heating part 13. This could lead to different result to the foaming material. For example, when the microwave penetrating part 11 is screwed or rotated more deeply within the electromagnetic heating part 13, the closed space inside the mold 10 will become smaller which could apply more pressure against to the foaming material. By adjusting a combination condition of the microwave penetrating part 11 and the electromagnetic heating part 13, the size of the closed space within the mold 10 could be adjusted for resulting a more stable and various condition of the foam body. Hence, the mold 10 of the present invention could benefit for manufactures or factories for saving money without purchasing any new expansive molds.

More preferably, the aforementioned third embodiment of the mold 10 comprises the middle lid 10 which won't rotate with the microwave penetrating part 11 and the electromagnetic heating part 13 when assembly. This will allow the mold 10 to be produced into a non-circular or non-symmetrical structure without affecting the microwave penetrating part 11 and the electromagnetic heating part 13 being screwed or rotated together.

Furthermore, the mold 10 of the present invention can have a temperature monitor device to control the temperature within the mold 10 while processing.

The concave-convex structure between the microwave penetrating part 11/the middle lid 12 and the electromagnetic heating part 13 can be but not limited to process by CNC (Computer Numerical Control), laser, casting, stamping, sand turning, die turning, raid tooling, heat pressing, injection molding or 3D printing as any conventional foaming techniques.

Before the foaming material of the present invention being placed inside the mold 10, the foaming material comprises three conditions: original, semi-foaming and complete foaming. The aforementioned original condition of the foaming material is referred to the condition that the foaming material is a regular plastic complex or compound without any pre-foaming being performed to it. The semi-foaming condition is referred to the condition that the foaming material was slightly foamed (not completely) before placing into the mold 10. The reason why the foaming material can achieve the semi-foaming condition could be incomplete reaction of the foaming agent or residuals of the foaming agent left inside the foaming material. For example, before the foaming material being placed inside the mold 10 of the present invention, there is normally a pre-compounding to the foaming material. Two foaming agent with different reaction temperature could be added with the foaming material while pre-compounding. The foaming agent with lower reaction temperature will be reacted firstly at pre-compounding with lower processing temperature. The other foaming agent with higher reaction temperature will further be reacted when foaming process provided by the present invention at higher reaction temperature. The foaming material at semi-foaming condition could be in various forms like bead, pellet or ball. The completely foaming condition otherwise is referred to that the foaming material was foamed completely before placing into the mold 10. If the foaming material is placed into the mold 10 with completely foaming condition, the mold 10 could be seen as providing a molding process to the foaming material rather than a foaming process. The foaming material at the completely foaming condition could be processed by any well-known foaming techniques such as continuous extrusion process or physical foaming, also known as supercritical fluid foaming. Physical foaming is normally performed by using high pressure fluid to immerse the foaming material before foaming process. The foaming material at completely foaming condition could also be but not limited to various forms like bead (E-TPU), pellet, ball, sheet, strip or star shapes.

The foam body of the present invention comprises continuously foaming structure or non-continuously foaming structure. The so-called continuously foaming structure could be obtained by using the original condition of the foaming material. The foam body produced by the original condition of the foaming material will have continuously foam structure. The non-continuously foaming structure otherwise is obtained by using the semi-foaming or completely foaming condition of the foaming material. The foam body could be seen as many foam beads or pellets being adhered together.

<<Foaming Material>>

The foaming material of the present invention comprises a thermoplastic material less than 99.98 wt %, a foaming agent at a range of 0.1 to 30 wt % and a microwave and/or electromagnetic energy absorbing agent at a range of 0.01 to 20 wt %. The thermoplastic material less than 99.98 wt % is also preferred to be less than 99 wt % in the foaming material.

A crosslinking agent, a microwave absorbing promoter and/or a functional agent could also be added in the foaming material as described above. The crosslinking agent is preferred to be at a range of 0.1 wt % to 10 wt %. The microwave absorbing promoter is preferred to be at a range of 0.01 wt % to 20 wt %. The functional agent is preferred to be at a range of 0.01 wt % to 20 wt %. Meanwhile, the amount of the foaming agent and the microwave and/or electromagnetic energy absorbing agent remains the same as above.

The thermoplastic materials comprise crystalline or amorphous liquid, solid materials and also their copolymers such as polyester thermoplastics, dynamic crosslinked thermoplastics, polystyrene resins, polyolefin resins, rubber, silicone resins, fluorinated resins, polycarbonate esters or biodegradable resins. The thermoplastic materials could also be polyethylene (PE), Polypropylene (PP), Polyvinyl chloride (PVC), Polystyrene (PS), Acrylonitrile-Butadiene-Styrene (ABS), phenolic resins (PF), Urea-Formaldehyde Resin (UF), Polyvinyl Alcohol (PVA), Ethylene-Propylene Rubber (EPM), Ethylene-Propylene-Diene Monomer (EPDM), Nitrile Butadiene Rubber (NBR), Olefin Thermoplastic Elastomers (TPO), Thermoplastic Vulcanizate (TPV), Thermoplastic Elastomer Ether (TPEE), Ethylene Vinyl Acetate (EVA), Thermoplastic Urethane (TPU), Polyurethane (PU), Poly Isocyanurate (PIR), Polyamide (PA), Polyethylene Terephthalate (PET), Polylactic Acid (PLA), 3-hydroxyvalerate copolymers (PHBV), Poly(tetramethylene succinate) (PBS), Melamine, Polyester Polyol (like polyester diol), Polycaprolactone (PCL), Poly(Lactide-co-Glycolide) (PLGA), Poly(3-hydroxybutyrate) (P3HB), Poly(methyl methacrylate) (PMMA), Epoxy, Polytetramethylene Carbonate Diol, Liquid Silicone Rubber (LSR), Poly (ethylene terephthalateco-1,4-cylclohexylenedimethylene terephthalate) (PETG) or Tritan Copolyester.

The foaming agent comprises physical foaming agent, chemical foaming agent or physical-chemical foaming agent complex (which is a combination of physical foaming agent and chemical foaming agent). The physical foaming agent can be but not limited to expanded microspheres, foamed microspheres, hollow microspheres (like glass hollow microspheres, ceramic hollow microspheres or phenolic hollow microspheres), powders (like glass fiber powder or carbon fiber powder), gases or liquids. The aforementioned gases could be but not limited to pentane, hexane, heptanes, dichloromethane, trichloromethane, butane, isoheptane, nitrogen, carbon dioxide, argon, helium, oxygen, neon or air. The aforementioned liquids could be but not limited to aliphatic hydroxyl liquid, alcohol with low boiling point (less than 300° C.), ester, ketone, aromatic hydroxyl liquid, ether, fluorine-chlorine hydrocarbon liquid, hydrocarbon liquid (like hydrofluorocarbon), hydrochlorofluorocarbons, hydrofluorocarbons, halogenated hydrocarbon, perfluoropropane, petroleum ether (like ethanol, methyl ether, ethyl ether, methyl ether, toluene, acetone, chlorofluoromethane, trifluoromethane, 1,1-difluoroethane, 1,1,1,2-tetrafluoroethane, chloromethane, chloroethane, dichloromethane, subfluoroacid, cyclohexane, cyclopentane). The chemical foaming agent could be but not limited to inorganic material like bicarbonate, sodium bicarbonate, ammonium carbonate, ammonium bicarbone, ammonium nitrite, potassium borohydride, sodium borohydride, hydrogen peroxide. The chemical foaming agent could also be organic material such as azodicarbonamide (AC), azobisisobutyronitrile (AIBN), Diisopropyl Azodicarboxylate (DIPA), N'-Dinitroso Pentamethylene Tetramine (DPT or DNPT), P-Toluene Sulfonyl Hydrazide (TSH), 4,4'-Oxydibenzenesulfonyl Hydrazide (OBSH), Benzenesulfonyl Hydrazide (BSH), Trihydrazine Triazine (THT), P-Toluenesulfonyl Semicarbazide (ADC-K), 2,2'-Azobis(2,4-dimethyl)valeronitrile (ABVN), Hydrazine sulfate salt, azonitrile, derivatives of azohydroxyl acid, benzene sulfonazide compounds, nitroso-compound, diazobenzene compounds, urea or compounds and their copolymers.

The crosslinking agent can be selectively added one or two or more kind inside the present invention. The crosslinking agent comprises dicumyl peroxide (DCP), 2,5-dimethyl-2,5-di(tert-butyl peroxy)-hexane (trade name L-101), Benzoyl Peroxide (BPO), Tert-butylperoxide (TBP), 2,5-dimethyl-2-hydroxy-5-tert-butyl peroxy-3-hexyne (trade name: OP-2), Triallyl isocyanurate (TAIC), Di-tert-butyl peroxide (DTBP), Acrylic acid (AA), Diacetyl peroxide, tert-butyl peroxypivalate (DTBP), tert-Butyl peroxyisopropylbenzene, 1,1-Di-(tert-butyl peroxy)-3,3,5-trimethylcyclohexane, 2,5-Dimethyl-2,5-di(tert-butylperoxy)hexane, 4,4-bis(tert-butyldioxy)valerate, bis(2,4-dichlorobenzoyl) peroxide, Bis(4-methylbenzoyl)peroxide, 1,4-Di-(2-tert-butylperoxyisopropyl) benzene, 1,4-Di-(2-tert-butylperoxyisopropyl) benzene, tert-Butyl Peroxybenzoate, 3,5,5-trimethylperoxyhexanoate, tert-Butyl peroxy 2-ethylhexyl carbonate, lauroyl peroxide, 3,3,5,7,7-pentamethyl-1,2,4-trioxepane, Di(4-tert-butylcyclohexyl) peroxydicarbonate, Dicetyl peroxydicarbonate, Dimyristyl peroxydicarbonate, tert-Amyl peroxypivalate, Peroxydicarbonic acid, diisobutyryl peroxide, tert-Butyl peroxyneodecanoate, tert-Butyl peroxyneoheptanoate, Di(3,5,5-trimethylhexanoyl) peroxide, 1,1,3,3-Tetramethylbutyl peroxyneodecanoate, Cumyl peroxyneodecanoate, Di(2-ethylhexyl) peroxydicarbonate, Bisisopropyl peroxydicarbonate, 1,1-Di(tert-butylperoxy)-3,3,5-trimethylcyclohexane, 2,2'-Azobis(2-methylbutyronitrile), decanoyl peroxide, 1,3-Bis(tert-butylperoxyisopropyl)benzene, 1,4-bis(tert-butylperoxy-isopropyl)benzene, 2,5-dimethyl-2,5-di(2-ethylhexanoylperoxy)hexane, tert-amylperoxy-2-ethylhexyl carbonate, tert-Butyl Hydroperoxide, 3,5-Diisopropylbenzene Hydroperoxide, Melaic anhydride (MAH) or its copolymers.

The aforementioned semi/sight foaming or complete foaming condition foaming material could also be used alone or in a combination of the chemical foaming agent, the physical foaming agent, the foamed microspheres or the foamed beads in the absence of the crosslinking agent. The foaming material could then be foamed through combined electromagnetic and microwave heating mold and creating a non-continuous or continuous foaming body structure.

The microwave and/or electromagnetic energy absorbing agent has functions of letting the foaming material absorbing microwave and/or electromagnetic. The microwave and/or electromagnetic energy absorbing agent could comprise one or mixtures of following materials. Materials having better microwave absorbing ability comprises: nitride, oxides, carbides, graphene, glass fiber, carbon fiber or cellulose nanocrystals. The nitride could further comprise boron nitride, silicon nitride, vanadium nitride, titanium nitride, gallium nitride or aluminum nitride. The oxide could further comprise alumina, magnesium oxide, zinc oxide, zirconia, iron oxide, silicon oxide, titanium oxide or copper oxide. The carbide could further comprise silicon carbide, vanadium carbide, titanium carbide, boron carbide, niobium carbide, molybdenum carbide, tantalum carbide, chromium carbide, hafnium carbide, zirconium carbide, tungsten carbide, carbon fiber or carbon nanotubes.

Materials having better electromagnetic energy absorbing ability comprises nano metal powder such as nano graphite powder, nano molybdenum powder, nano silicon powder, nano titanium powder, nano cobalt powder, nano bismuth powder, nano gold powder, nano silver powder, nano copper powder, nano aluminum powder, nano zinc powder, nano tin powder, nano nickel powder, nano iron powder or nano tungsten powder.

A main function of the microwave absorbing promoter is to make the foaming material absorb the microwave more evenly and efficiently. The microwave absorbing promoter is more suitable for applied to the semi-foaming condition or completely foaming condition foaming material. Instead of blending or compounding with the thermoplastic material like foaming agent, the microwave absorbing promoter is more like an additive for adding externally. To be more specific, the microwave absorbing promoter is added for coating onto a surface of the foaming material at semi-foaming condition or completely foaming condition so as to promoting the efficiency of the foaming material to absorb the microwave. The microwave absorbing promoter will generate heat caused by molecular friction or electrical loss under microwave field because of dipole polarization and ion conduction. Hence, the microwave absorbing promoter is preferred to be ionizable material such as surfactant or salt for promoting the heating efficiency and conduction. The ionizable material can be uniformly absorbed on the surface of the foaming material to remove or replace the air that adheres onto the foaming material. This could reduce the air gap between the beads or pellets of the foaming material so as to improve the binding, heat conduction and heating efficiency of the foaming material. The microwave absorbing promoter is preferably to be liquid or solvent comprising polar substances. Also, dissociable or ionizable liquid or solvent such as water, surfactant, salt, organic acid (with equal or less than 6 carbons acid), organic alcohols, etc could also be used as microwave absorbing promoter in the present invention. The aforementioned microwave absorbing promoter could be used solely or in combination as desired. The surfactant includes cationic surfactant, anionic surfactant, amphoteric surfactant or nonionic surfactant. Although the nonionic surfactant is unable be dissociable or ionizable in the liquid. The existence of the nonionic surfactant can also help other ionized material to be absorbed on the foaming material more stably and uniformly. A melting point of the surfactant is relatively low compared to above-mentioned materials. This low melting point surfactant can rapidly raise the surface temperature of the foaming material after absorbing the microwave/electromagnetic energy which could facilitate the binding of each foaming material. The salts as described above are preferably to be compounds containing metal ions w/ ammonium ions, acid ions or nonmetallic ions. The microwave absorbing promoter has great microwave absorbing ability and excellent heat conducting ability. The microwave absorbing promoter is selected according to the process temperature. When the temperature of the foaming process in the present invention is relatively high, the microwave absorbing promoter should be the one with higher boiling point. Otherwise, the microwave absorbing promoter should be the one with lower boiling point when the temperature of the foaming process in the present invention is relatively low. The microwave absorbing promoter can improve stability of the foaming material at high melting point. The microwave absorbing promoter can also improve a binding force between each foaming material (beads) and also can avoid problems of fragment, cracking or insufficient strength to the final foam body.

The functional agent is added according the desired properties of the foaming material and the final foam body. The functional agent comprises plasticizers, lubricants, surfactants, foam/bubbles regulators, flame retardants, coupling agents, enhancers, antioxidants, antistatic agents, heat stabilizers, light stabilizers, coloring agents, processing modifiers, impact modifiers, inorganic powders or fillers.

The plasticizers comprises Benzoic acid ester (like Methyl Benzoate, Ethyl benzoate, Di(propylene glycol) dibenzoate or its derivatives), Ester compounds (like Triethyl citrate, Trimethyl citrate, Triethyl O acetylcitrate or its derivatives), Ether compounds (like Dimethyl adipate, Ethylene glycol monobutyl ether or its derivatives), polycaprolactone compounds (like Poly(caprolactone) diol or its derivatives) or polycarbonate compounds (like Methyl carbonate, Phenyl carbonate or its derivatives). The surfactant includes cationic surfactant, anionic surfactant, amphoteric surfactant or nonionic surfactant. The bubbles regulator comprises zinc borate, borax, phosphoric acid nucleating agent, phenol nucleating agent or polyvinyl fluoride powder. The inorganic powder comprises talc, calcium carbonate, kaolin, zeolite, mica, sodium thiosulfate. The fillers comprise organic microspheres, inorganic microspheres, metal particles or metal oxide microspheres. The fillers could reduce the usage of plastic and reduce weight of the foam body for the present invention. The fillers can also provide physical strength or mechanical strength like wear resistance to the foam body for the present invention. The organic and the inorganic microspheres can be in a solid form or hollow form which hollow microsphere could reduce the weight for the foam body of the present invention. The organic microsphere includes polyester microsphere, polyvinylidine chloride microsphere, acrylic resin microsphere, phenolic resin microsphere, polylactic acid microsphere, polystyrene microsphere, epoxy microsphere, polyaniline microsphere, polyamide microsphere, melamine microsphere or formaldehyde microsphere. The inorganic microsphere includes glass microsphere, ceramic microsphere, silica microsphere, carbon microsphere, calcium carbonate microsphere or graphene microsphere. The metal particle comprises magnesium, aluminum, zirconium, calcium, titanium, vanadium, chromium, cobalt, nickel, copper, germanium, molybdenum, silver, indium, tin, tungsten, iridium, platinum, iron or gold particle. The metal oxide microsphere comprises aluminium oxide microsphere. The aforementioned microsphere could be added alone with the foaming material or also could be used in combination in the foaming material.

Surface of the aforementioned microspheres can be treated with various surface treatments to increase homogeneity of blending with the foaming material of the present invention. For example, the surface of the microspheres can be treated with polysiloxane or fluorinated compounds to reduce or lower the surface tension.

EMBODIMENTS

With reference to Chart 1 as below, two preferred embodiments of the present invention are presented. These two embodiments are using EVA and PE as the thermoplastic material respectively.

CHART 1

| The foaming material | | |
|---|---|---|
| Type | | Content |
| Thermoplastic material (Alternation) | EVA | 57 wt % (physical foaming)/ 67 wt % (chemical foaming) |
| | PE | 57 wt % (physical foaming)/ 67 wt % (chemical foaming) |
| Foaming agent: (Physical or Chemical foaming agent | Physical foaming agent: foamed microspheres | 20 wt % |
| | Chemical foaming agent: AC | 10 wt % |
| | Crosslinking agent: DCP | 5 wt % |
| | Microwave and/or electromagnetic absorbing agent: Zinc oxide | 8 wt % |
| | Functional agent: Calcium carbonate | 10 wt % |

| Parameters of the microwave and electromagnetic foaming process | |
|---|---|
| Type | Values |
| Frequency of microwave | 300 MHz to 300 GHz |
| Power of electromagnetic energy | 2450 MHz or 915 MHz |

The above specification, examples, and data provide a complete description of the present disclosure and use of exemplary embodiments. Although various embodiments of the present disclosure have been described above with a certain degree of particularity, or with reference to one or more individual embodiments, those with ordinary skill in the art could make numerous alterations or modifications to the disclosed embodiments without departing from the spirit or scope of this disclosure.

What is claimed is:

1. A microwave and electromagnetic heated foaming method comprising steps of:
  putting a foaming material into a mold,
  the foaming material comprising multiple foam pellets and each of the multiple foam pellets is in a shape of a bead, sheet, strip or star, wherein:
  the mold comprises a microwave penetrating part and an electromagnetic heating part screwed together to form a closed space inside the mold;
  the microwave penetrating part and the electromagnetic heating part have a matched concave-convex structure;
  the microwave penetrating part is plastic material and the electromagnetic heating part is metallic material;
  applying microwave and electromagnetic energy to the mold at the same time under atmospheric condition or a low pressure condition;
  wherein the microwave is applied to the microwave penetrating part with a frequency of the microwave in a range of 300 MHz-3000 GHz and the electromagnetic energy is applied to the electromagnetic heating part of the mold with a power of the electromagnetic energy in a range of 1 W-2000 KW which generates heat from electromagnetic heating part of the mold to the foaming material inside the mold; and adhering multiple foam pellets of the foaming material together inside the mold by applying the microwave and the electromagnetic energy.

2. The method as claimed in claim 1, wherein: an external force from pneumatic machinery, electric machinery or hydraulic machinery is further applied to the mold during the step of applying the microwave and the electromagnetic energy.

\* \* \* \* \*